United States Patent Office 3,359,429
Patented Dec. 19, 1967

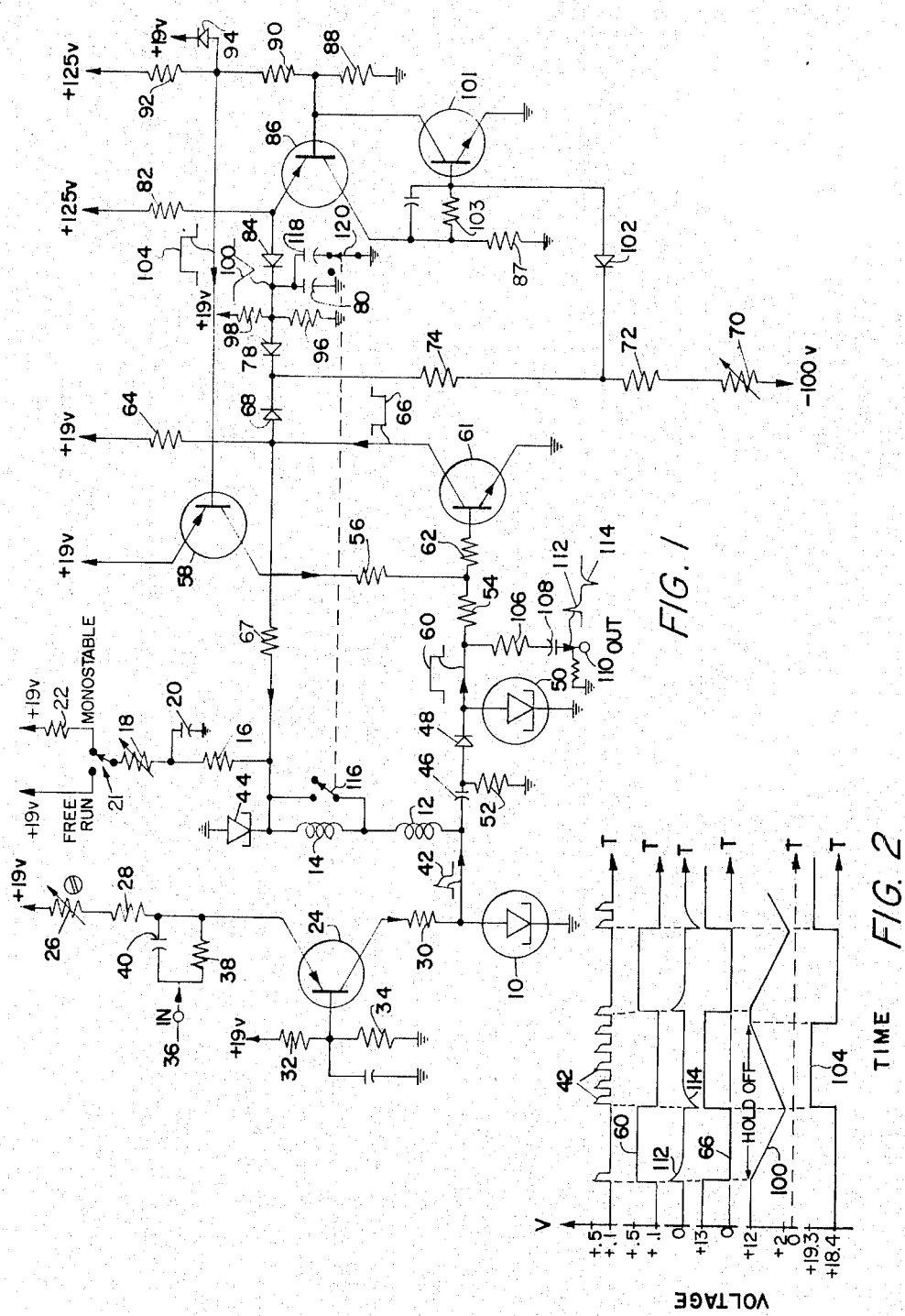

3,359,429
TRIGGER GENERATOR CIRCUIT HAVING SYNCHRONIZED ASTABLE INPUT OSCILLATOR
Henry A. Zimmerman, Beaverton, Oreg., assignor to Tektronix, Inc., Beaverton, Oreg., a corporation of Oregon
Filed Mar. 23, 1964, Ser. No. 353,704
11 Claims. (Cl. 307—88.5)

The subject matter of the present invention relates generally to electrical pulse generator circuits for generating output pulses which are related in time to input signals applied to such circuits, and in particular to a trigger generator circuit that may be operated in a manner in which the input signals are employed to synchronize an astable input multivibrator in such circuit and to cause such input multivibrator to produce several successive synchronized output signals before a closely synchronized one of the output signals of such input multivibrator is allowed to trigger a bistable output multivibrator to produce an output trigger pulse so that such trigger pulse is more nearly related in time to such input signal. The term "multivibrator" as used herein refers to astable, monostable or bistable switching circuits employing a single active element, such as a tunnel diode, as well as to more conventional multivibrator circuits employing two cross connected active elements, such as transistors or vacuum tubes.

The trigger circuit of the present invention is especially useful when employed in the timing unit of a cathode ray oscilloscope of the sampling type in order to produce trigger pulses which are applied to fast ramp generator and comparator circuit in the timing unit to control when sampling or interrogating pulses are produced by such timing unit. These interrogating pulses are thereby accurately related in time to different portions of a repetitive high frequency input signal and are employed in such sampling oscilloscope to reproduce the waveform of such input signal at a low frequency. One such fast ramp generator and comparator circuit is disclosed in copending U.S. patent application, Ser. No. 201,457, entitled "Pulse Generator Circuit," filed by John V. Rogers on June 11, 1962, now U.S. Patent 3,317,743.

The present trigger circuit has several advantages over conventional trigger circuits, including a simpler and less expensive construction which operates in a more efficient, trouble-free manner. In addition, the output trigger pulse produced by the present trigger circuit is more accurately related in time with respect to the input signal applied to such trigger circuit to form such trigger pulse when the trigger circuit is operated in a synchronized mode. Also, the present trigger circuit employs an improved monostable tunnel diode multivibrator which requires less D.C. voltage supply current and is more sensitive to low frequency trigger signals or those having slow rise time so that such monostable multivibrator is triggered at substantially the same voltage level, regardless of the frequency or slope of the trigger signal.

It is, therefore, one object of the present invention to provide an improved trigger generator circuit for generating output trigger pulses which are more precisely related in time to input signals applied to such trigger circuit to produce such trigger pulses.

Another object of the invention is to provide an improved trigger generator circuit which is simple and inexpensive in construction and which is operated in an efficient manner by input signals having a wide range of frequencies.

A further object of the present invention is to provide an improved trigger generator circuit which employs a monostable multivibrator to produce output trigger pulses which are accurately related in time to input signals applied to the multivibrator to trigger such multivibrator at the same voltage level, even though the frequency or rise time of such input signals varies over a wide range.

An additional object of the present invention is to provide an improved synchronous trigger generator circuit which employs an astable input multivibrator whose output signals are synchronized with input signals applied thereto and which produces several successive output signals before one of such output signals is allowed to trigger a bistable multivibrator to produce an output trigger pulse, so that such output trigger pulse is more closely synchronized with the corresponding input signal producing such trigger pulse.

Other objects and advantages of the present invention will be apparent from the following detailed description of a preferred embodiment thereof, and from the attached drawings of which:

FIG. 1 is a schematic diagram of a trigger generator circuit in accordance with the present invention, and FIG. 2 shows a plurality of different signals produced by the circuit of FIG. 1 in time relationship to one another.

As shown in FIG. 1, one embodiment of the present trigger generator circuit includes a tunnel diode 10 which may be connected as an astable input oscillator and has a peak current of ten milliamperes with its cathode connected to ground, and its anode connected through a pair of series inductances 12 and 14 each of 2.2 microhenries, to a source of D.C. bias current. A portion of the bias current for the tunnel diode 10 is supplied through the inductances 12 and 14 and a pair of series connected load resistors 16 and 18 of 3.3 kilohms and 100 kilohms, respectively, whose common connection is connected to ground through a bypass capacitor 20 of .2 microfarad. The variable load resistor 18 is connected to the movable contact of a two position switch 21 having one fixed contact connected directly to a positive D.C. voltage source of +19 volts and its other fixed contact connected through a load resistor 22 of 3.3 kilohms to a positive D.C. voltage source of +19 volts. When the movable contact of switch 21 is in the "Monostable" position, the tunnel diode 10 is connected as a monostable multivibrator, while such tunnel diode is connected as an astable oscillator or free running multivibrator in the "Free Run" position of such switch. In the "Monostable" position of the switch 21 the total bias current for the tunnel diode 10 is slightly below the peak current of such tunnel diode 10, while in the "Free Run" position of such switch the bias current is above the peak current. A portion of this total bias current is also supplied through a PNP type input transistor 24 from a source of positive D.C. bias voltage of +19 volts connected through a variable bias resistor 26 of 2.5 kilohms and a fixed resistor 28 of 2 kilohms to the emitter of such transistor. The input transistor 24 has its collector connected to the anode of the tunnel diode 10 through a coupling resistor 30 of 100 ohms, and its base connected between a pair of voltage divider resistors 32 and 34 of 15 kilohms and 5.1 kilohms, respectively, which are connected between a source of postive D.C. voltage of +19 volts and ground. The emitter of transistor 24 is also connected to an input terminal 36 through an R.C. coupling impedance including a resistor 38 of 39 ohms in parallel with the capacitor 40 of 27 picofarads. Thus, transistor 24 is connected as a common base amplifier which is normally biased conducting and has a current gain of near unity for input signals applied to input terminal 36.

When tunnel diode 10 is connected as a "one-shot" or monostable multivibrator, it is normally biased to a low voltage stable state. Thus, positive going input signals applied to input terminal 36 are transmitted through transistor 24 to the anode of the tunnel diode 10 and trigger such tunnel diode to a high voltage state to produce a positive output voltage 42 on its anode. The monostable multivibrator includes a back diode 44 having its cathode connected to inductor 14 and its anode grounded so that such back diode is normally biased nonconducting by the D.C. voltage drop across tunnel diode 10. The positive output voltage of the tunnel diode is applied through the inductances 12 and 14 to the cathode of the back diode 44, and renders the back diode conducting. As a result, such back diode effectively short circuits the relatively high impedance of load resistors 16, 18 and 22 at the high voltage state of the tunnel diode 10 so that the load line for the tunnel diode is non-linear and crosses the characteristic curve of such tunnel diode to the left of its valley point in a substantially vertical direction. Thus, the monostable multivibrator including tunnel diode 10, has an extremely high load resistance in its normal low voltage stable state, which causes substantially all of the current of the input signal applied to the anode of the tunnel diode to be transmitted through such tunnel diode as trigger current and causes very little of such input signal current to be transmitted through the inductances 12 and 14 and the load resistors 16 and 18. This enables the monostable multivibrator to be triggered at substantially the same voltage level, regardless of the frequency or rise time of the input signal because the amount of input signal current flowing through the tunnel diode does not change with frequency in spite of the presence of the inductances 12 and 14 due to the fact that such inductances are connected in series with a high load resistance. The back diode 44 enables the tunnel diode 10 to be connected as a monostable multivibrator even though the high resistance of load resistors 16, 18 and 22 would normally produce a nearly horizontal load line since such back diode reduces the load resistance when the tunnel diode is triggered to a high voltage state. This improved monostable multivibrator is disclosed in more detail in copending U.S. patent application, Ser. No. 341,981, entitled, "Monostable Multivibrator Employing Negative Resistance Diode," filed by John V. Rogers on Feb. 3, 1964, now abandoned.

The anode of the first tunnel diode 10 is connected through a coupling capacitor 46 in series with a coupling diode 48 to the anode of a second tunnel diode 50 having a peak current of ten milliamperes whose cathode is grounded. A shunt resistor 52 is connected to ground from the anode of the diode 48, so that such resistor forms a pulse differentation network with capacitor 46 and changes the output voltage 42 of the first tunnel diode 10 into a positive spike pulse corresponding to the leading edges of the output voltage and a negative spike pulse corresponding to the trailing edge of such output voltage. The second tunnel diode 50 is connected as a bistable output switching circuit or multivibrator normally biased in a low voltage stable state with its anode connected to a source of positive D.C. bias voltage of +19 volts through a coupling resistor 54 of 33 ohms, a load resistor 56 of 2.32 kilohms and an inverter transistor 58. The inverter transistor 58 is a PNP type transistor which may be of a 2N714A type and is normally biased conducting to supply sufficient bias current to the second tunnel diode 50 to normally bias it just below the peak current of such tunnel diode. Thus, the positive spike pulse corresponding to the leading edge of the output voltage 42 is transmitted through diode 48 and triggers the tunnel diode 50 to its high voltage stable state, while the negative spike pulse corresponding to the trailing edge of such output signal is blocked by the diode 48.

The positive step voltage produced by the tunnel diode 50 when such tunnel diode is triggered, forms the leading edge of a rectangular output trigger pulse 60 and is transmitted to the base of an NPN type switching transistor 61 through the resistor 54 and a coupling resistor 62 of 100 ohms. The switching transistor 61 may be of the 2N2218 type, with its emitter grounded and its collector connected to a source of positive D.C. bias voltage of +19 volts through a load resistor 64 of 1.33 kilohms, so that such transistor is connected as a common emitter amplifier and is normally biased nonconducting. When the positive going output trigger pulse 60 is applied to the base of the switching transistor 61, it renders such transistor conducting and produces a negative going voltage pulse 66 on the collector thereof. The negative voltage pulse 66 is applied through the resistor 67 and inductances 14 and 12 as a disabling pulse to the anode of the tunnel diode 10, and prevents such tunnel diode from being synchronized or triggered by input signals for the duration of the pulse 66.

Another portion of the total bias current for the tunnel diode 10 is also supplied from a positive D.C. voltage source of +19 volts through the resistors 64 and 67 and inductors 14 and 12. Thus when the transistor 61 is rendered conducting by the pulse 60 to produce the negative voltage pulse 66 the current normally flowing through resistor 67 to provide a part of the normal bias current of the tunnel diode 10 now flows through the transistor 61 so that the bias current of tunnel diode 10 becomes insufficient to cause such tunnel diode to free run or to enable input signals to trigger the tunnel diode.

The additional current through resistor 64 due to the conduction of transistor 61, also produces an increased voltage drop across the resistor 64 resulting in the negative voltage pulse 66 referred to above. In the absence of the negative voltage pulse 66, the current also flows through the resistor 64 from the positive voltage source connected thereto and through a normally conducting diode 68 and series resistors 70, 72 and 74 to a negative D.C. voltage source of −100 volts. However the negative pulse 66 reversely biases the diode 68 and renders it nonconducting to prevent this current from flowing through such diode during the time of such pulse for a purpose hereafter described.

The upper terminal of the resistor 74 is also connected to the cathode of a first gating diode 78 whose anode is connected to the upper terminal of a hold-off capacitor 80 of 620 picofarads, having its lower terminal grounded. The hold-off capacitor is normally charged to an upper limit voltage of about +12 volts by current flowing from a source of positive D.C. bias voltage of +125 volts through a charging resistor 82 of 120 kilohms and a second disconnect diode 84 whose cathode is connected to the upper terminal of such capacitor. This upper limit voltage on the hold-off capacitor 80 is set by the D.C. bias voltage on the base of a PNP type transistor 86 whose emitter is connected to the anode of disconnect diode 84 and whose collector is connected to ground through a load resistor 87 of 1 kilohm. The base of transistor 86 is connected across a bias resistor 88 of 12 kilohms whose lower terminal is grounded and whose upper terminal is connected to a source of D.C. bias voltage of +125 volts through a pair of series connected resistors 90 and 92 of 8.2 kilohms and 82 kilohms, respectively. Thus, resistors 88, 90 and 92 form a voltage divider and resistor 88 applies a positive D.C. bias voltage of +11.5 volts to the base of transistor 86 due to the fact that the common connection of resistors 90 and 92 is normally clamped to +19 volts by a limiting diode 94 whose anode is connected to such common connection and cathode is connected to a voltage source of +19 volts.

Once the hold-off capacitor 80 is charged up to +12 volts, the second disconnect diode 84 is rendered nonconducting to prevent further charging, by the +12.2 volts reference voltage maintained on the emitter of transistor 86 due to the voltage on its base. The first disconnect diode 78 is biased nonconducting by the voltage resulting from current through the voltage divider made on resistors 70, 72 and 74 as long as diode 68 is conducting. However, the disconnect diodes 78 and 84 do have some small reverse bias current which would ordinarily cause the upper limit charge voltage to leak off of the hold-off capacitor 80. In order to compensate for this leakage, a high impedance voltage divider including a first resistor 96 of 12 megohms connected to ground and a second resistor 98 of 8.2 megohms connected to a positive D.C. voltage source of +19 volts, is provided so that the voltage produced across resistor 96 is applied to the upper terminal of the hold-off capacitor.

When the negative voltage disabling pulse 66 renders diode 68 nonconducting the voltage across resistor 74 decreases to render disconnect diode 78 conducting. The hold-off capacitor then discharges through resistors 70, 72 and 74 and such disconnect diode. Thus, a negative going ramp shaped voltage 100 is produced on the upper terminal of the hold-off capacitor as the voltage on such capacitor decreases. When the hold-off ramp voltage 100 reaches a lower limit of +2 volts, the upper terminal of the resistor 72 is at approximately zero volts due to the voltage drop across resistor 74 and diode 78. An NPN type transistor 101 has its base connected through a coupling diode 102 to the upper terminal of resistor 72 and its emitter grounded so that such transistor is rendered nonconducting by the negative going ramp voltage at this time. As a result, a positive step voltage is produced on the collector of transistor 101 and is applied to the base of transistor 86 to render transistor 86 nonconducting. This causes a more positive voltage to be produced on the emitter of transistor 86 and forwardly biases the diode 84 to charge the hold-off capacitor 80 in a positive direction toward its upper limit voltage of +12 volts by current flowing through the charging resistor 82. When transistor 86 is again rendered conducting by the hold-off ramp voltage, a positive voltage pulse is transmitted from the collector of such transistor through a coupling resistor 103 of 4.7 kilohms to the base of transistor 101. This renders the latter transistor conducting and produces a negative going step voltage on the collector of such latter transistor, as shown in FIG. 2.

The positive step voltage produced on the collector of transistor 101 is transmitted as the leading edge of a rectangular hold-off pulse 104 to the base of the inverter transistor 58 which reverses the polarity of such hold-off pulse and applies it as a negative going voltage pulse to the anode of tunnel diode 50 and to base of gating transistor 61 to revert such tunnel diode back to its low voltage stable state and to render such switching transistor nonconducting. Therefore, the leading edge of hold-off pulse 104 causes the output trigger pulse 60 produced by the tunnel diode 50 to return to its quiescent low voltage state and forms the trailing edge of such trigger pulse, as shown in FIG. 2. In addition, the disabling pulse 66 is caused to return to its normal high voltage state of +13 volts and the diode 68 is rendered conducting to turn "off" disconnect diode 78. This causes the current which was flowing through resistors 70, 72 and 74 to be directed to the input tunnel diode 10 in order to enable such tunnel diode to be synchronized or triggered by input signals applied to input 36. However, the output signals 42 produced by input tunnel diode 10 are not allowed to trigger output tunnel diode 50 until after the hold-off pulse 104 ceases and causes the D.C. bias current of such output tunnel diode to increase sufficiently to enable triggering. Thus, several successive output signals 42 are produced by the input tunnel diode 10 before one of such output signals synchronizes or triggers the output tunnel diode 50 to produce the leading edge of the output trigger pulse, as shown in FIG. 2.

As mentioned previously, the input tunnel diode 10 may also be connected as an astable multivibrator and may have a free running frequency of 100 kilocycles per second (kc. p.s.). In this mode of operation the input tunnel diode synchronizes with the input signals applied thereto when such input signals have frequencies of 100 kc. p.s. and greater up to about 10 mc. p.s. The output signal of such astable multivibrator is more closely synchronized with the input signal after several successive output signals 42 are produced. Thus by preventing the output tunnel diode 50 from being triggered by the output signal of the input tunnel diode 10 until after the generation of several output signals, the output trigger pulse 60 produced by such output tunnel diode is more accurately related in time or synchronized with respect to its corresponding input signal. Input signals having a frequency below 100 kc. p.s. cannot synchronize the free running multivibrator of tunnel diode 10, so that such tunnel diode is operated as a monostable multivibrator to enable such input signals to trigger the tunnel diode and produce an output signal.

From the above it can be seen that transistor 86 and 101 are part of a monostable hold-off multivibrator which prevents the tunnel diode 50 from being triggered during both the negative going and positive going portions of the ramp voltage produces across the hold-off capacitor 80, as indicated in FIG. 2. The discharge time of the hold-off capacitor may be controlled by varying the resistance of resistor 70 to change the slope of the negative going portion of the ramp voltage 100 so that the period of the hold-off multivibrator and thus the hold-off time, may be accurately regulated.

The output trigger pulse 60 is transmitted through a coupling resistor 106 of 100 ohms and a coupling capacitor 108 of .7 microfarad to an output terminal 110 as a positive spike pulse 112 corresponding to the leading edge of such output trigger pulse, and a negative spike pulse corresponding to the trailing edge of such output trigger pulse. The positive spike trigger pulse 112 may then be employed to trigger the fast ramp generator of a timing unit in a sampling oscilloscope, such as that shown in copending U.S. patent application, Ser. No. 201,457 referred to above. The input tunnel diode 10 is disabled from producing an output signal 42 during the generation of the output trigger pulse 60 to prevent the output signal from being transmitted to output terminal 110 at that time and to enable proper operation of such timing unit.

The repetition rate of the astable multivibrator including tunnel diode 10, can be increased to about 10 megacycles per second (mc. p.s.) by closing a switch 116 to short circuit inductor 14 and thereby reduce the amount of load inductance connected to such tunnel diode. This enables the astable multivibrator to be synchronized by input signals of 10 mc. p.s. or more up to about 1000 mc. p.s. The hold-off capacitance employed in the hold-off multivibrator including transistors 86 and 100 may include a capacitor 118 of .027 microfarad connected in parallel with hold-off capacitor 80 by a normally closed switch 120 which has its movable contact grounded and ganged to the movable contact of switch 116. Thus when switch 116 is closed, switch 120 is opened to decrease the hold-off capacitance and to shorten the length of the hold-off signal 100. This reduces the number of high frequency output voltage signals 42 which would otherwise be produced before triggering tunnel diode 50 with one of the output signals in order to synchronize such one output voltage signal with the high frequency input signal before triggering tunnel diode 50. Thus in the "open" position of the switch 116 and the "closed" position of switch 120 shown, approximately twenty output signals 42 of a frequency of 100 kc. p.s. are produced before the second tunnel diode 50 is triggered to produce output trigger pulse 60, while when switch 116 is closed and switch 120 is open, approximately fifty output signals 42 of a frequency of 10 mc. p.s. are produced before the second tunnel diode is triggered to produce an output pulse.

It will be obvious to those having ordinary skill in the art that various changes may be made in the details of the above described preferred embodiment of the present invention without departing from the spirit of the invention. For example, multivibrators employing tubes or transistors can be employed in place of the tunnel diode multivibrators. Also different types of transistors can be employed by reversing the polarity of the biasing voltages and the values of the circuit components can vary from those given. Therefore, the scope of the present invention should only be determined by the following claims.

I claim:
1. A pulse generator circuit, comprising:
an astable input oscillator connected to an input terminal; first means for appling input signals to said input oscillator to cause it to produce output signals which are synchronized with said input signals;
an output switching circuit having at least one stable state with its input connected to the output of said input oscillator and its output connected to an output terminal so that the output signals of said input oscillator triggered said output switching circuit and cause it to transmit output pulses to said output terminal; and
second means for preventing said output switching circuit from being triggered for a predetermined time until after several of said synchronized output signals are produced by said input oscillator so that the output signal which triggers said output switching circuit is more closely synchronized with one of said input signals.

2. A pulse generator circuit in accordance with claim 1 in which the input oscillator is a free running tunnel diode oscillator which is synchronized by the input signals.

3. A pulse generator circuit in accordance with claim 2 in which the output switching circuit is a bistable circuit, and said second means applies reversion and hold-off signals to said output switching circuit which revert said output circuit to its quiescent state and hold-off the retriggering of said output circuit until several of the synchronized output signals are produced by the input oscillator after the output circuit is reverted.

4. A pulse generator in accordance with claim 3 in which said second means also applies a disabling signal to the input oscillator to prevent it from producing output signals after the output switching circuit is triggered until said output circuit is reverted.

5. A trigger generator circuit, comprising:
an input multivibrator connected to an input terminal;
means for applying input signals to said input multivibrator to cause it to produce output signals which are synchronized with said input signals;
an output multivibrator connected as a bistable multivibrator with its input connected to the output of said input multivibrator and its output connected to an output terminal so that the output signals of said input multivibrator trigger said output multivibrator and cause it to transmit output trigger pulses to said output terminal;
a hold-off means having an input connected to the output of said output multivibrator and having a pair of outputs; and
means for connecting one of said pair of outputs to said input multivibrator and the other of said pair of outputs to said output multivibrator to apply a disabling signal to said input multivibrator and to apply a reverting hold-off signal to said output multivibrator, said disabling signal preventing said input multivibrator from producing said output signals until after said output multivibrator is reverted, while said hold-off signal prevents said output multivibrator from being triggered until after several of said output pulses are produced so that the output pulse which triggers said output multivibrator is closely synchronized with its corresponding input signal.

6. A synchronous trigger generator circuit, comprising:
an input multivibrator connected as an astable multivibrator to an input terminal;
means for applying input signals to said input multivibrator to cause it to produce output signals which are synchronized with said input signals;
an output multivibrator connected as a bistable multivibrator with its input connected to the output of said input multivibrator and its output connected to an output terminal so that the output signals of said input multivibrator trigger said output multivibrator and cause it to transmit output trigger pulses to said output terminal;
a hold-off means including a monostable hold-off multivibrator, having an input connected to the output of said output multivibrator and having a pair of outputs; and
means for connecting one of said pair of outputs to said input multivibrator and the other of said pair of outputs to said output multivibrator to apply disabling signal to input multivibrator and to apply a reverting hold-off signal to said output multivibrator, said disabling signal preventing said input multivibrator from producing said output signals until after said output multivibrator is reverted, while said hold-off signal prevents said output multivibrator from being triggered until after several of said output pulses are produced so that the output pulse which triggers said output multivibrator is closely synchronized with its corresponding input signal.

7. A synchronous trigger generator circuit, comprising:
an input multivibrator connected as a free running multivibrator to an input terminal;
means for applying input signals to said input multivibrator to cause it to produce output signals which are synchronized with said input signals;
an output multivibrator connected as a bistable multivibrator with its input connected to the output of said input multivibrator and its output connected to an output terminal so that the output signals of said input multivibrator trigger said output multivibrator and cause it to transmit output trigger pulses to said output terminal;
a hold-off means including a switching device and a monostable hold-off multivibrator, having an input connected to the output of said output multivibrator and having a pair of outputs from said switching device and said hold-off multivibrator; and
means for connecting the output of said switching device to said input multivibrator and the output of said hold-off multivibrator to said output multivibrator to apply a disabling signal to said input multivibrator and to apply a reverting hold-off signal to said output multivibrator, said disabling signal preventing said input multivibrator from producing said output signals until after said output multivibrator is reverted, while said hold-off signal prevents said output multivibrator from being triggered until after several of said output pulses are produced so that the output pulse which triggers said output multivibrator is closely synchronized with its corresponding input signal.

8. A trigger circuit, comprising:
a tunnel diode connected as a multivibrator;
an inductance having one end connected to said tunnel diode;
a load resistance having a high value of resistance connected to the other end of said inductance;
a back diode connected between said other end of said inductance and ground;
means for applying input signals to said tunnel diode to cause it to produce output signals;
a bistable multivibrator having its input connected to the output of said tunnel diode and its output connected to an output terminal so that said bistable multivibrator is triggered by the output signals of said tunnel diode and transmits output trigger pulses to said output terminal; and a hold-off means having its input connected to the output of said second tunnel diode, and having a pair of outputs each connected to a different one of said bistable multivibrator and said tunnel diode, said hold-off means including means for applying a disabling pulse to said first tunnel diode to prevent it from producing said output signals when the bistable multivibrator is in its triggered stable state and means for applying a reverting hold-off signal to said bistable multivibrator to revert it to its normal stable state and to prevent said bistable multivibrator from being triggered by the output signals of said first tunnel diode for a predetermined time after the termination of said disabling pulse and after the generation of several of said output signals.

9. A trigger circuit, comprising:
a first tunnel diode connected as a monostable multivibrator;
an inductance having one end connected to said first tunnel diode;
a load resistance having a high value of resistance connected to the other end of said inductance;
a back diode connected between said other end of said inductance and ground;
means for applying a D.C. voltage to normally bias said back diode in a high impedance condition and said first tunnel diode in a low voltage stable state so that when said first tunnel diode is triggered the impedance of said back diode decreases to enable the reversion of said first tunnel diode to its stable state;
means for applying input signals to trigger said first tunnel diode and cause it to produce output signals;
a second tunnel diode connected as a bistable multivibrator having its input connected to the output of said first tunnel diode and its output connected to an output terminal so that said second tunnel diode is triggered by the output signals of said first tunnel diode and transmits output trigger pulses to said output terminal; and
a hold-off means having its input connected to the output of said second tunnel diode, and having a pair of outputs each connected to a different one of said first and second tunnel diodes, said hold-off means including switch means for applying a disabling pulse to said first tunnel diode to prevent the first tunnel diode from being triggered by said input signals when the second tunnel diode is in its triggered stable state, and hold-off multivibrator means for applying a reverting hold-off signal to said second tunnel diode to revert it to its normal stable state and to prevent said second tunnel diode from being triggered by the output signals of said first tunnel diode for a predetermined time after the termination of said disabling pulse and after the generation of several of said output signals.

10. A synchronous trigger circuit, comprising:
a first tunnel diode connected as an astable multivibrator;
an inductance having one end connected to said first tunnel diode;
a load resistance having a high value of resistance connected to the other end of said inductance;
a back diode connected between said other end of said inductance and ground;
means for applying input signals to trigger said first tunnel diode and cause it to produce output pulses synchronized with said input signals;
a second tunnel diode connected as a bistable multivibrator having its input connected to the output of said first tunnel diode and its output connected to an output terminal;
a coupling capacitor connected between the output of said first tunnel diode and the input of said second tunnel diode to cause said second tunnel diode to be triggered in response to the leading edge of an output signal of said first tunnel diode;
a switching transistor having its input connected to the output of said second tunnel diode and having its output connected to said first tunnel diode so that the output signal of said second tunnel diode switches said transistor and applies a disabling pulse to said first tunnel diode to prevent it from producing output signals when the second tunnel diode is in its triggered stable state; and
a monostable hold-off multivibrator having its input connected to the output of said switching transistor and its output connected to the inputs of said switching transistor and said second tunnel diode for applying a reverting hold-off signal to said second tunnel diode and said transistor to revert them to their normal operating state and to prevent said second tunnel diode from being triggered by the output signals of said first tunnel diode for a predetermined time after the termination of said disabling pulse and after the generation of several of said output signals so that the output signal which triggers said second tunnel diode is more closely synchronized with said input signals.

11. A synchronous trigger circuit, comprising:
an input multivibrator connected as an astable multivibrator;
means for applying input signals to said input multivibrator to synchronize its output signals with said input signals;
an output multivibrator connected as a bistable multivibrator having its input connected to the output of said input multivibrator and its output connected to an output terminal so that said output multivibrator is triggered by the output signals of said input multivibrator to generate an output trigger pulse at said output terminal;
a switching transistor having its input connected to the output of said output multivibrator and having its output connected to said input multivibrator so that the output pulse of said output multivibrator switches said transistor and applies a disabling pulse to said input multivibrator to prevent it from producing output signals when the output multivibrator is in its triggered stable state;
a hold-off capacitor;
a first D.C. current source;
a first gating diode connected between said hold-off capacitor and said first current source;
a second D.C. current source;
a second gating diode connected between said hold-off capacitor and said second current source;
a third gating diode connected between the output of said switching transistor and said second gating diode and of opposite polarity to said second gating diode;
a pair of transistors of opposite type connected to said hold-off capacitor to form a monostable hold-off multivibrator therewith, one of said pair of transistors having its emitter connected to the common connection of said first current source and said first gating diode and having its collector connected to ground the other of said pair of transistors having its base connected to the collector of said one transistor and its collector connected to the base of said one transistor and its emitter grounded;
means for applying a D.C. reference voltage to the base of said one transistor to determine one of the limits of the ramp voltage produced on said hold-off capacitor;
a coupling diode connected between the base of said other transistor and said second gating diode and of opposite polarity to said second gating diode to determine the other limit of said ramp voltage; and means for transmitting a reverting hold-off pulse from the collector of said other transistor to the inputs of said output multivibrator and said switching transistor to revert them to their initial operating states and to prevent said output multivibrator from being triggered by the output signals of said input multivibrator for a predetermined time after the termination of said disabling pulse.

References Cited

UNITED STATES PATENTS

| 2,688,696 | 9/1954 | Reeves | 328—63 |
| 3,061,788 | 10/1962 | Kobbe | 328—63 |
| 3,124,706 | 3/1964 | Alexander | 307—88.5 |

ARTHUR GAUSS, *Primary Examiner.*

R. EPSTEIN, J. ZAZWORSKY, *Assistant Examiner.*